Patented Apr. 29, 1924.

1,492,488

UNITED STATES PATENT OFFICE.

WALTER FREDERICK SUTHERST, OF BERKELEY, CALIFORNIA, ASSIGNOR, BY MESNE ASSIGNMENTS, TO HERBERT & HERBERT, INC., OF PERTH AMBOY, NEW JERSEY, A CORPORATION OF NEW JERSEY.

MANUFACTURE OF ALKALI METAL THIOSULPHATES AND POLYSULPHIDES.

No Drawing.   Application filed July 16, 1920.   Serial No. 396,635.

*To all whom it may concern:*

Be it known that I, WALTER F. SUTHERST, subject of the King of Great Britain, residing at Berkeley, in the county of Alameda and State of California, have invented certain new and useful Improvements in the Manufacture of Alkali Metal Thiosulphates and Polysulphides, of which the following is a specification.

My invention relates to certain new and useful improvements in the manufacture of alkali metal and alkali earth thiosulphates, and has for its principal objects to manufacture alkali thiosulphates from cheap raw material and also produce a useful by-product.

In the present method of manufacture, alkali metal thiosulphate is made from alkali metal sulfite and sulfur or instead of sulfur an alkali sulfide is used. There are also several other known methods of producing alkali metal thiosulphate, but I will now describe my method of accomplishing the above results.

For obvious reasons, I shall describe my method of manufacturing sodium thiosulphate, together with the production of a valuable by-product.

I boil together ground crude sulfur with lime, in the presence of a solution of sodium sulfate, for commercial purposes ordinary salt cake is used. The boiling takes place in exactly the same way as is used in preparing lime sulfur mixture for agricultural purposes. The boiling is continued until all the sulfur has been dissolved. By this method the following reaction takes place.

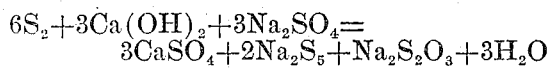

$$6S_2 + 3Ca(OH)_2 + 3Na_2SO_4 = 3CaSO_4 + 2Na_2S_5 + Na_2S_2O_3 + 3H_2O$$

The proportions of chemicals used are in the equivalents of the above equation. The sodium sulfate reacts with calcium sulfide and thiosulphate to form the corresponding sodium salts.

When the process is completed the reaction mass is filtered off, the precipitate of calcium sulfate is held on the filter and washed, the washings being either added to the filtrate or used for making a new charge. The calcium sulfate is either used in agricultural fertilizers or for other purposes.

The filtrate contains sodium thiosulphate and sodium polysulphides. The sodium thiosulphates cannot be well separated in the presence of the sodium sulfides, which must first be separated or otherwise disposed of. However, the mixture consisting of the sodium thiosulphates and sodium polysulphides can be used directly as a horticultural spray, as an active oxidizer in the electroplating industry and cognate arts.

What I claim is:

1. A process for the manufacture of alkali metal thiosulphates which consists in reacting alkali earth metal hydrates with sulfur converting the formed alkali earth metal thiosulphates and alkali earth metal polysulphides to the alkali metal thiosulphates and alkali metal polysulphides by the reaction with alkali metal sulfates.

2. A process for the manufacture of alkali metal thiosulphates which consists in reacting calcium hydrate with sulfur converting the formed calcium thiosulphate and calcium polysulphides to the alkali metal thiosulphates and alkali metal polysulphides by the reaction with alkali metal sulfates.

3. A process for the manufacture of sodium thiosulphate which consists in reacting calcium hydrate with sulfur converting the formed calcium thiosulphate and calcium polysulphides to sodium thiosulphate and sodium polysulphides by the reaction with sodium sulfate.

In testimony whereof I hereunto affix my signature in the presence of two witnesses.

WALTER FREDERICK SUTHERST.

Witnesses:
  Mrs. S. W. KNOWLES,
  ISABEL F. SONGBOURNE.